US010341843B2

(12) United States Patent
Gao et al.

(10) Patent No.: US 10,341,843 B2
(45) Date of Patent: Jul. 2, 2019

(54) METHOD, SYSTEM AND CONNECTION DEVICE FOR IMPLEMENTING LOCAL GATEWAY SERVICE

(71) Applicant: ZTE CORPORATION, Shenzhen, Guangdong Province (CN)

(72) Inventors: Yin Gao, Shenzhen (CN); Shuang Liang, Shenzhen (CN); Feng He, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 224 days.

(21) Appl. No.: 15/101,416

(22) PCT Filed: Jun. 5, 2014

(86) PCT No.: PCT/CN2014/079219
§ 371 (c)(1),
(2) Date: Jun. 3, 2016

(87) PCT Pub. No.: WO2015/085730
PCT Pub. Date: Jun. 18, 2015

(65) Prior Publication Data
US 2016/0309319 A1 Oct. 20, 2016

(30) Foreign Application Priority Data
Dec. 11, 2013 (CN) .......................... 2013 1 0674974

(51) Int. Cl.
*H04W 8/00* (2009.01)
*H04W 8/08* (2009.01)
(Continued)

(52) U.S. Cl.
CPC ........... *H04W 8/082* (2013.01); *H04W 8/005* (2013.01); *H04W 8/26* (2013.01); *H04W 76/12* (2018.02);
(Continued)

(58) Field of Classification Search
CPC combination set(s) only.
See application file for complete search history.

(56) References Cited

U.S. PATENT DOCUMENTS 9,807,662 B2 * 10/2017 Wang ..................... H04W 36/26
2011/0058513 A1 * 3/2011 Ai ............................ H04W 56/00
370/312
(Continued)

FOREIGN PATENT DOCUMENTS

CN 102056129 A 5/2011
CN 102056141 A 5/2011
(Continued)

OTHER PUBLICATIONS

3GPP TSG-RAN WG2 Meeting #72, Jacksonville, USA, Nov. 15-19, 2010. Change Request. R2-106961.
(Continued)

*Primary Examiner* — Steven S Kelley
(74) *Attorney, Agent, or Firm* — Ling Wu; Stephen Yang; Ling and Yang Intellectual Property (57) ABSTRACT

The present document provides a method, a device and a system for implementing a local gateway service. Wherein the method includes: adding, by a first connection device, a second connection device for a terminal (300); interacting collocated local gateway address information between the first connection device and the second connection device (301); and reporting, by the first connection device, determined collocated local gateway address information to a core network, and using, by the core network, the collocated local gateway address information to perform the local gateway service (302). Through the technical solution provided by the embodiment of the present document, the core network obtains the collocated local gateway address infor-
(Continued)

mation, and the local gateway service is implemented aiming at a dual-connection service scenario.

4 Claims, 5 Drawing Sheets

(51) Int. Cl.
| | |
|---|---|
| H04W 76/12 | (2018.01) |
| H04W 8/26 | (2009.01) |
| H04W 92/20 | (2009.01) |
| H04W 92/14 | (2009.01) |
| H04W 88/16 | (2009.01) |
| H04W 48/20 | (2009.01) |

(52) U.S. Cl.
CPC ............ *H04W 92/20* (2013.01); *H04W 48/20* (2013.01); *H04W 88/16* (2013.01); *H04W 92/14* (2013.01)

(56) References Cited

U.S. PATENT DOCUMENTS

| | | | | |
|---|---|---|---|---|
| 2011/0151878 A1* | 6/2011 | Xu | ........................ | H04W 48/10 455/444 |
| 2011/0194484 A1* | 8/2011 | Lee | ........................ | H04B 7/155 370/315 |
| 2011/0199973 A1* | 8/2011 | Li | ........................ | H04W 72/005 370/328 |
| 2012/0039250 A1* | 2/2012 | Li | ........................ | H04W 48/18 370/328 |
| 2012/0207129 A1* | 8/2012 | Sun | ........................ | H04W 76/18 370/331 |
| 2012/0276910 A1* | 11/2012 | Zhang | ............... | H04W 36/0005 455/439 |
| 2013/0003697 A1 | 1/2013 | Adjakple et al. | | |
| 2014/0349635 A1* | 11/2014 | Lin | ........................ | H04W 24/02 455/418 |
| 2015/0029999 A1* | 1/2015 | Horn | ..................... | H04W 36/22 370/331 |
| 2016/0227439 A1* | 8/2016 | Wang | ..................... | H04W 76/12 |
| 2016/0277918 A1* | 9/2016 | Wang | ..................... | H04L 45/38 |

FOREIGN PATENT DOCUMENTS

| | | |
|---|---|---|
| CN | 102209365 A | 10/2011 |
| CN | 102801822A A | 11/2012 |
| CN | 102868997 A | 1/2013 |
| CN | 102869122 A | 1/2013 |
| CN | 106576397 A | 4/2017 |
| WO | 2012164984 A1 | 12/2012 |

OTHER PUBLICATIONS

3GPP TSG RAN2 Meeting #82, Fukuoka, Japan, May 20-24, 2013. NEC Corporation; Relevance of LIPA/SIPTO in SCE U-plane architecture discussions. R2-131999.

LIPA/SIPTO support in the small cell; Samsung; 3GPP TSG-RAN WG3 Meeting #81; Aug. 19-23, 2013, Barcelona, Spain; R3-131440.

* cited by examiner

METHOD, SYSTEM AND CONNECTION DEVICE FOR IMPLEMENTING LOCAL GATEWAY SERVICE

TECHNICAL FIELD

The present document relates to a small base station network technology, in particular to a method, a system and a connection device for implementing a local gateway service.

BACKGROUND OF THE RELATED ART

Figure 1:
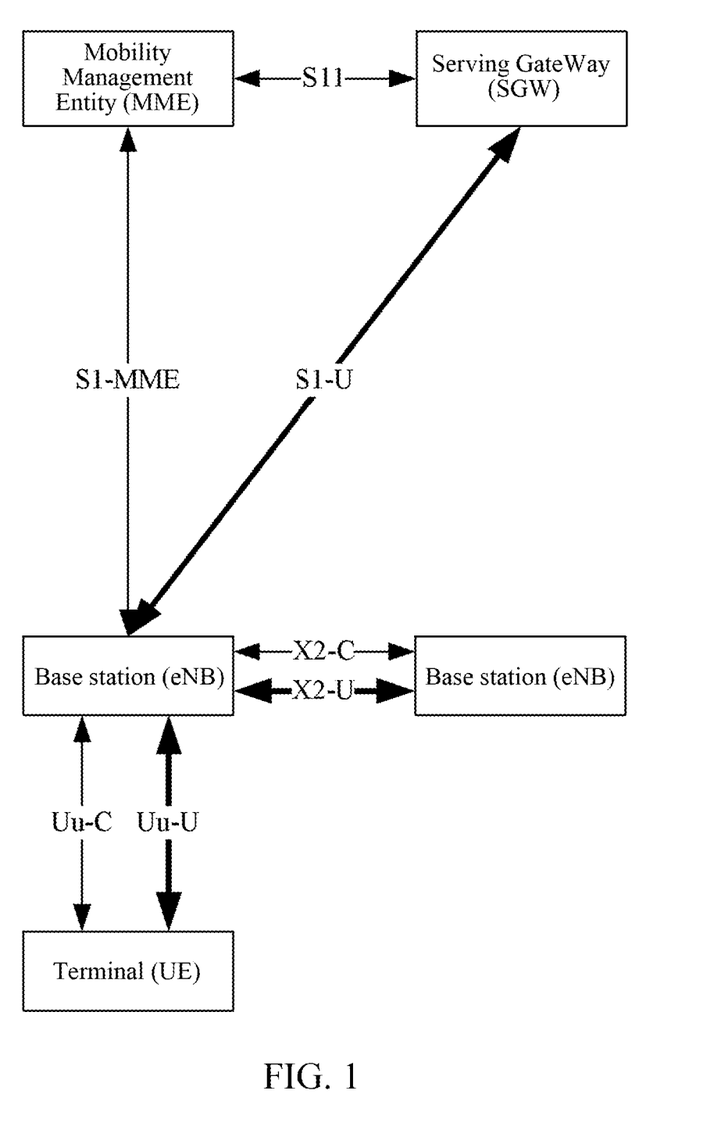
FIG. 1 is a schematic diagram of an overall architecture of LTE in the related art.

FIG. 1 is a schematic diagram of an overall architecture of an LTE (Long Term Evolution) system in the related art. As shown in FIG. 1, an LTE architecture comprises an MME (Mobility Management Entity), an SGW (Serving Gate-Way), User Equipment (called as UE for short) and base stations (eNodeB, called as eNB for short), herein an interface between the UE and the eNB is a Uu interface, an interface between the eNB and the MME is an S1-MME (S1 for the control plane) interface, an interface between the eNB and the SGW is an S1-U interface, and interfaces between the eNBs are X2-U (X2-User plane) and X2-C (X2-Control plane) interfaces. In LTE, a protocol stack of the S1-MME interface is divided into the following protocol layers from bottom to top: L1 protocol, L2 protocol, IP (Internet Protocol), SCTP (Stream Control Transmission Protocol), and S1-AP (S1-Application Protocol). In LTE, a protocol stack of the S1-U interface is divided into the following protocol layers from bottom to top: L1 protocol, L2 protocol, UDP/IP (User Data Protocol/Internet Protocol), and GTP-U (GPRS Tunneling Protocol-User plane).

With wide requirements by users for local services and Internet services, LIPA (Local IP Access) and SIPTO (Selected IP Traffic Offload) are put forward in 3GPP and are used for offloading not only data services from local home networks but also data services from Internet. Simultaneously, for the UE and a core network, a permanent online function needs to be supported, i.e., after a data connection is established, the UE can transmit data to external data networks at any time, the external data networks can also transmit data to the UE. The external data networks involved in this document refer to IP networks which do not belong to a PLMN (Public Land Mobile Network) but are connected with the PLMN, and for example, can be home internal networks or Internet. This function is called as an LIPA@LN (Local IP Access@Local Network) or SIPTO@LN (Selected IP Traffic Offload@Local Network) function. If an L-GW (Local GateWay) which supports LIPA or SIPTO services is arranged on a base station (which can be a macro eNB and can also be a home eNB, i.e., an (H)eNB), this base station is called as a collocated L-GW.

Under a related LTE system, in order to implement an SIPTO@LN function, under a scenario of the collocated L-GW, the base station (which can be a macro eNB and can also be a home eNB) where the collocated L-GW is located needs to report an IP address of the L-GW to the core network through a UE-special message, and a PDN GW (Packet Data Network GateWay) for the SIPTO service will select to use the L-GW address provided by the home base station or the base station ((H)eNB) instead of an address inquired by an DNS (Domain Name Server). Therefore, the (H)eNB needs to carry the IP address of the L-GW in an initial UE message and an uplink NAS transport message.

Figure 2:
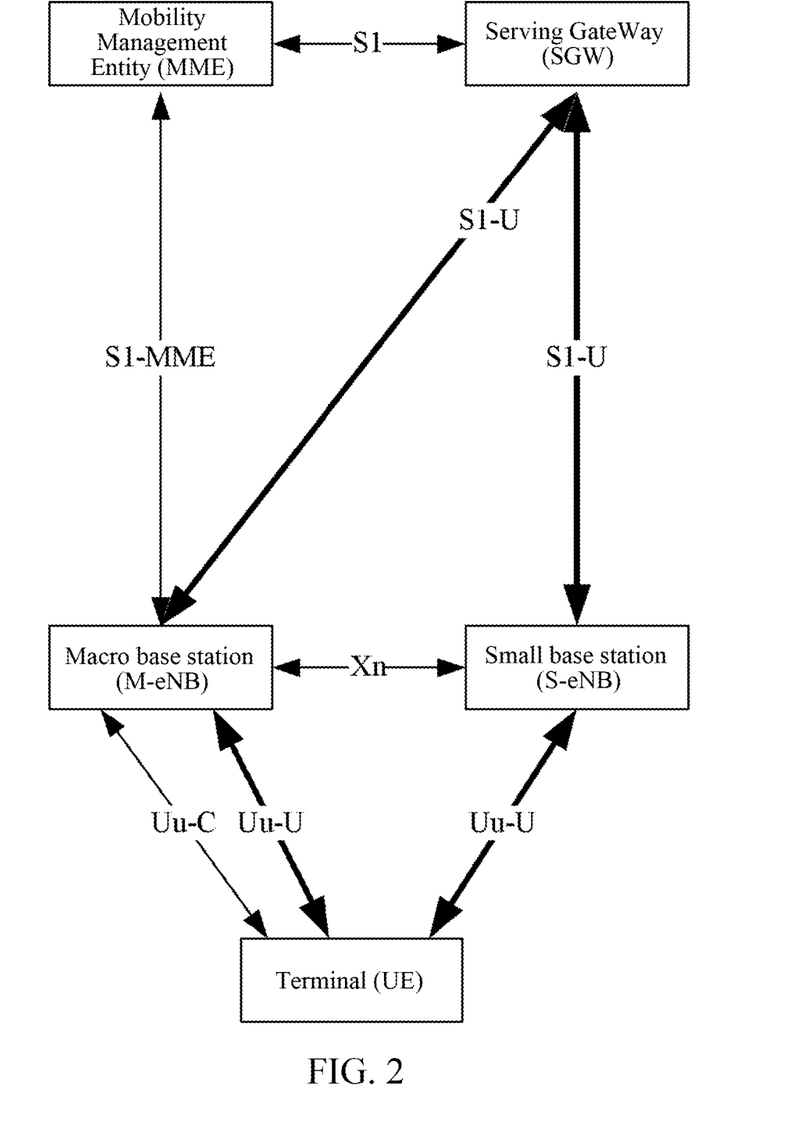
FIG. 2 is a schematic diagram of an overall architecture of a related small cellular base station system.

At present, due to the lack of frequency spectrum resources and the sharp increase of high-traffic services of mobile users, in order to increase user throughput and improve mobility performance, the demand of performing hotspot coverage by adopting high-frequency points such as 3.5 GHz is increasingly obvious, and adopting low-power nodes also becomes a new application scenario. However, since signal attenuation at high-frequency points is comparatively serious, the coverage range of new cells is comparatively small and the new cells and the existing cells are not co-site, hence, if users move between these new cells or between the new cells and the existing cells, frequent handover processes inevitably will be caused, consequently user information will be frequently transmitted between the base stations, a very great signaling shock will be caused to the core network and the introduction of numerous small cellular base stations on a wireless side will be restrained. FIG. 2 is a schematic diagram of an overall architecture of an existing small cellular base station system. As shown in FIG. 2, the overall architecture mainly comprises an MME, an SGW, UE and base stations eNBs, herein the eNBs comprise a master base station (MeNB, Master eNB) and a secondary base station (SeNB, Secondary eNB). An interface between the UE and the eNB is a Uu interface, an interface between the MeNB and the MME is an S1-MME interface, an interface between the MeNB or SeNB and the SGW is an S1-U interface, and an interface between the eNBs is an Xn interface. User data can be issued from the core network to users through the MeNB, and can also be issued from the core network to the users through the SeNB. After the users access to the MeNB, a dual-connection can be implemented by adding, modifying and deleting the SeNB.

Under a small base station system as shown in FIG. 2, since the concepts of the MeNB and the SeNB are introduced, when a user needs to establish LIPA@LN or SIPTO@LN, the core network needs to know an address of the L-GW. For example, under an SCE scenario, due to the deployment of dense small cells, it needs to consider a specific position of a collocated L-GW and how to implement accurate reporting of needed L-GW address information when the MeNB or SeNB changes, thus the core network can implement the LIPA@LN or SIPTO@LN function according to the information. At present, no technical solution for implementing a local gateway service aiming at the scenario with a dual-connection service feature is provided.

SUMMARY

In order to solve the technical problem, the present document provides a method, a system and a connection device for implementing a local gateway service, which can implement the local gateway service aiming at a scenario with a dual-connection service feature.

In order to achieve the purpose of the present document, the present document provides a method for implementing a local gateway service, comprising: adding, by a first connection device, a second connection device for a terminal;

interacting collocated local gateway address information between the first connection device and the second connection device; and reporting, by the first connection device, determined collocated local gateway address information to a core network, and using, by the core network, the collocated local gateway address information to perform the local gateway service.

Preferably, before the method, it further comprises: accessing, by the terminal, to the first connection device.

Preferably, the first connection device supports a collocated Local GateWay (L-GW); and when the terminal accesses to the first connection device, the method further comprises:

reporting, by the first connection device, local collocated L-GW address information of the first connection device itself to the core network; and using, by the core network, a collocated local gateway corresponding to an obtained collocated L-GW address as a Packet Data Network GateWay (PDN GW) for a Selected IP Traffic Offload @ Local Network (SIPTO@LN) or Local IP Access @ Local Network (LIPA@LN) service of the terminal.

Preferably, the first connection device is a master base station (MeNB) and the second connection device is a secondary base station (SeNB); and reporting, by the first connection device, local collocated L-GW address information of the first connection device itself to the core network comprises:

reporting, by the MeNB, the local collocated L-GW address information to a Mobility Management Entity (MME) in the core network through an S1 interface message.

Preferably, the S1 interface message is a common S1 interface message or a UE-special S1 interface message of the terminal;

wherein the common S1 interface message is one or more of an S1 establishment request message and a base station configuration update message; and the UE-special S1 interface message is one or more of an initial UE message and an uplink non-access transport message.

Preferably, interacting collocated local gateway address information between the first connection device and the second connection device comprises:

establishing a connection interface between the first connection device and the second connection device; and interacting the collocated local gateway address information through the established connection interface.

Preferably, the first connection device is an MeNB and the second connection device is an SeNB;

the connection interface is an Xn or X2 interface; and interacting the collocated local gateway address information through the established connection interface comprises: obtaining, by the MeNB, collocated local gateway information of the SeNB through a connection interface establishment process, a base station configuration update process or a connection interface message related to UE, and determining whether to add the SeNB to provide a dual-connection service for the UE according to a preset local policy of the MeNB.

Preferably, reporting, by the first connection device, obtained collocated local gateway address information to the core network comprises:

reporting, by the MeNB, an updated collocated local gateway address to the MME in the core network through an S1 interface message according to a result of the local policy.

Preferably, the S1 interface message is a common S1 interface message or a UE-special S1 interface message of the terminal;

wherein the common S1 interface message is a base station configuration update message; and the UE-special S1 interface message is one or more of an initial UE message and an uplink non-access transport message.

Preferably, using, by the core network, the collocated local gateway address information to perform the local gateway service comprises:

using, by the core network, the collocated local gateway corresponding to the updated collocated local gateway address as the PDN GW for an SIPTO@LN or LIPA@LN service of the UE.

Preferably, the first connection device is a master radio network controller and the second connection device is a secondary radio network controller.

The present document further provides a system for implementing a local gateway service, at least comprising a first connection device, a second connection device, a core network device and a terminal, wherein, the first connection device is configured to add the second connection device for the terminal; interact collocated local gateway address information with the second connection device; and report determined collocated local gateway address information to the core network device;

the second connection device is configured to interact the collocated local gateway address information with the first connection device; and the core network device is configured to receive collocated local gateway address information reported by the first connection device and use the collocated local gateway address information to perform the local gateway service.

Preferably, the terminal is further configured to access to the first connection device;

the first connection device is configured to support a collocated L-GW, and when the terminal accesses to the first connection device, report local collocated L-GW address information of the first connection device itself to the core network device; and the core network device is further configured to use a collocated local gateway corresponding to an obtained collocated L-GW address as a PDN GW for an SIPTO@LN or LIPA@LN service of the UE.

Preferably, the first connection device is an MeNB in a small base station system or a master RNC in a 3G network;

the second connection device is an SeNB in the small base station system or a secondary RNC in the 3G network; and correspondingly, the core network device is an MME in the small base station system or a Servicing GPRS Supporting Node (SGSN) in the 3G network.

The present document further provides a connection device, at least comprising a processing module, an interaction module and a reporting module, wherein, the processing module is configured to add a second connection device for a terminal;

the interaction module is configured to interact collocated local gateway address information with the added second connection device; and the reporting module is configured to report determined collocated local gateway address information to a core network device.

Preferably, the connection device supports a collocated L-GW; and the processing module is further configured to report local collocated L-GW address information of the connection device to the core network device.

Compared with the prior art, the technical solution of provided by the present application comprises: adding, by a first connection device, a second connection device for a terminal; interacting collocated local gateway address information between the first connection device and the second connection device; and reporting, by the first connection device, determined collocated local gateway address information to a core network, and using, by the core network, the collocated local gateway address information to perform the local gateway service. Through the technical solution provided by the embodiment of the present document, the core network obtains the collocated local gateway address information, and the local gateway service is implemented aiming at a dual-connection service scenario.

Other features and advantages of the present document will be described hereafter in the description, and partially become obvious from the description or are understood by implementing the present document. The purposes and other advantages of the present document can be realized and achieved through structures specially pointed out in the description, the claims and the drawings.

BRIEF DESCRIPTION OF DRAWINGS

The drawings described here are used for providing further understanding about the present document and constitute a part of the present application. The exemplary embodiments of the present document and the description thereof are used for explaining the present document instead of constituting improper limitations on the present document. Among the drawings.

PREFERRED EMBODIMENTS

The embodiments of the present document will be described below in detail in combination with the drawings. It needs to be stated that the embodiments and the features of the embodiments in the present document can be freely combined with one another under the situation of no conflict.

Figure 3:
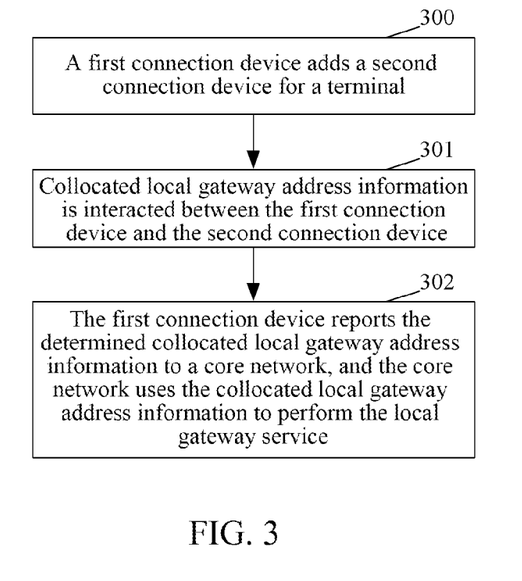
FIG. 3 is a flowchart of a method for implementing a local gateway service provided by the embodiment of the present document.

FIG. 3 is a flowchart of a method for implementing a local gateway service provided by the embodiment of the present document. As shown in FIG. 3, the method comprises:

In step 300, a first connection device adds a second connection device for a terminal.

By taking a small base station system as an example, the first connection device is an MeNB and the second connection device is an SeNB. By taking a 3G network as an example, the first connection device is a master RNC (Radio Network Controller) and the second connection device is a secondary RNC.

Generally, when the first connection device receives a measurement report reported from the terminal, the first connection device will add the second connection device for the terminal. The specific implementation of this step belongs to a technique well-known by one skilled in the art, and the specific implementation thereof is unrelated to the present document, is not used for limiting the protection range of the present document and thus is not repetitively described here.

Before the step, the method further comprises: UE accesses to the first connection device.

If the first connection device itself supports a collocated L-GW (Local GateWay), the first connection device will report local collocated L-GW address information of the first connection device itself to the core network, and the core network uses a collocated local gateway corresponding to an obtained collocated L-GW address as a PDN GW for an SIPTO@LN or LIPA@LN service of the UE. By taking the small base station system as an example, when the UE accesses to the MeNB, the MeNB reports the local collocated L-GW address information to an MME through an S1 interface message. The S1 interface message here can be a common S1 interface message and can also be a UE-special S1 interface message, herein the common S1 interface message can be one or more of an S1 establishment request message and a base station configuration update message; the UE-special S1 interface message can be one or more of an initial UE message and an uplink NAS transport message, and however, the UE-special S1 interface message is not limited to the listed S1 interface messages; and the MME uses the collocated local gateway corresponding to the reported collocated L-GW address information as the PDN GW for the SIPTO@LN or LIPA@LN service of the UE.

If the first connection device itself does not support the collocated L-GW, the first connection device does not report the collocated L-GW address information to the core network at this moment. By taking the small base station system as an example, when the UE is accessed to the MeNB, the MeNB does not carry the information of the collocated L-GW in the S1 interface message.

In step 301, collocated local gateway address information is interacted between the first connection device and the second connection device. Specifically, a connection interface is firstly established between the first connection device and the second connection device. For example, an Xn or X2 interface is established between the MeNB and the SeNB, and the specific implementation of a connection interface establishment process belongs to a technique well-known by one skilled in the art and thus is not repetitively described here.

This step emphasizes that, the collocated local gateway address information is interacted through the connection interface between the first connection device and the second connection device. For example, the interaction of the collocated local gateway address information can be implemented through an Xn or X2 interface establishment process, a base station configuration update process or an Xn or X2 interface message related to the UE.

By taking the small base station system as an example, after the MeNB interacts the collocated local gateway information of the SeNB through the connection interface, the MeNB can determine whether to add the SeNB to provide a dual-connection service for the UE according to a preset local policy of the MeNB. For example, if the SeNB does not support the collocated local gateway (e.g., does not carry the collocated local gateway address information), the MeNB can add the SeNB as another base station for bearing user plane data issuance; and if the SeNB supports the collocated local gateway, the MeNB can select whether to use the collocated local gateway on the SeNB as the PDN GW for the SIPTO@LN or LIPA@LN service of the UE according to other information such as load information. For example, if the load of the MeNB is comparatively heavy, the collocated gateway on the SeNB can be selected and used to provide the SIPTO or LIPA service for the UE.

In step 302, the first connection device reports obtained collocated local gateway address information to a core network, and the core network uses the collocated local gateway address information to perform the local gateway service.

By taking the small base station system as an example, the MeNB reports an updated collocated local gateway address, e.g., a collocated gateway address of a selected SeNB, to the MME through an S1 interface message according to an interaction result of the local policy in step 301. The S1 interface message here can be a common S1 interface message and can also be a UE-special S1 interface message, herein the common S1 interface message can be a base station configuration update message; the UE-special S1 interface message can be one or more of an initial UE message and an uplink NAS transport message, and however, the UE-special S1 interface message is not limited to the listed S1 interface messages; and the MME performs local update according to the collocated L-GW address information reported by the MeNB, and uses a collocated local gateway corresponding to the current collocated L-GW address as the PDN GW for the SIPTO@LN or LIPA@LN service of the UE.

It needs to be stated that, if the MeNB and the SeNB do not support the collocated L-GW, step 302 does not need to be implemented; if the information previously reported is that the MeNB supports the collocated L-GW but the SeNB after interaction does not support the collocated L-GW, the original collocated L-GW information is maintained and does not need to be updated and reported to the MME; and if the MeNB previously does not support the collocated L-GW, the SeNB after interaction supports the collocated L-GW, and the collocated L-GW of the SeNB is used to provide the service for the UE, the MeNB needs to report the updated collocated L-GW information to the MME.

Figure 4:
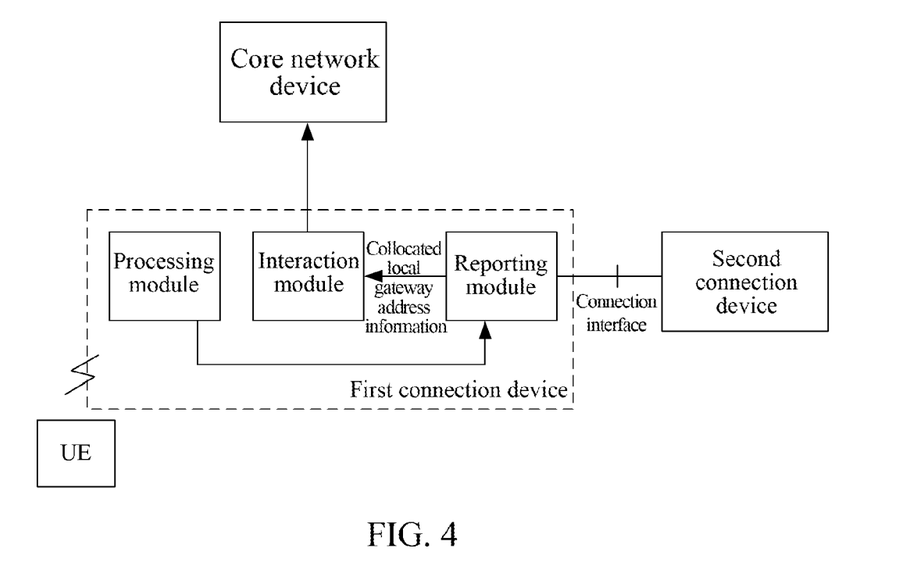
FIG. 4 is a composition diagram of a system for implementing a local gateway service provided by the embodiment of the present document.

FIG. 4 is a composition diagram of a system for implementing a local gateway service provided by the embodiment of the present document. As shown in FIG. 4, the system at least comprises a first connection device, a second connection device, a core network device and a terminal, herein, the first connection device is used to add the second connection device for the terminal; interact collocated local gateway address information with the second connection device; and report determined collocated local gateway address information to the core network device;

the second connection device is used to interact the collocated local gateway address information with the first connection device; and the core network device is used to receive collocated local gateway address information reported by the first connection device and use the collocated local gateway address information to perform the local gateway service.

Herein, the terminal is further used to access to the first connection device;

the first connection device, supporting a collocated L-GW, is further used to report local collocated L-GW address information of the first connection device to the core network device when the terminal accesses to the first connection device; and the core network device is further used to use a collocated local gateway corresponding to an obtained collocated L-GW address as a PDN GW for an SIPTO@LN or LIPA@LN service of the UE.

The first connection device can be an MeNB in a small base station system or a master RNC in a 3G network; and the second connection device can be an SeNB in the small base station system or a secondary RNC in the 3G network.

Correspondingly, the core network device can be an MME in the small base station system or an SGSN (Serving GPRS Supporting Node) in the 3G network.

Specifically, as shown in FIG. 4, the connection device at least comprises a processing module, an interaction module and a reporting module, herein, the processing module is used to add a second connection device for a terminal;

the interaction module is used to interact collocated local gateway address information with the added second connection device; and the reporting module is used to report determined collocated local gateway address information to a core network device.

When the connection device supports a collocated L-GW, the processing module is further used to report local collocated L-GW address information of the connection device to the core network device when a terminal accesses.

The method of the present document will be described below in detail in combination with the specific embodiments.

Figure 5:
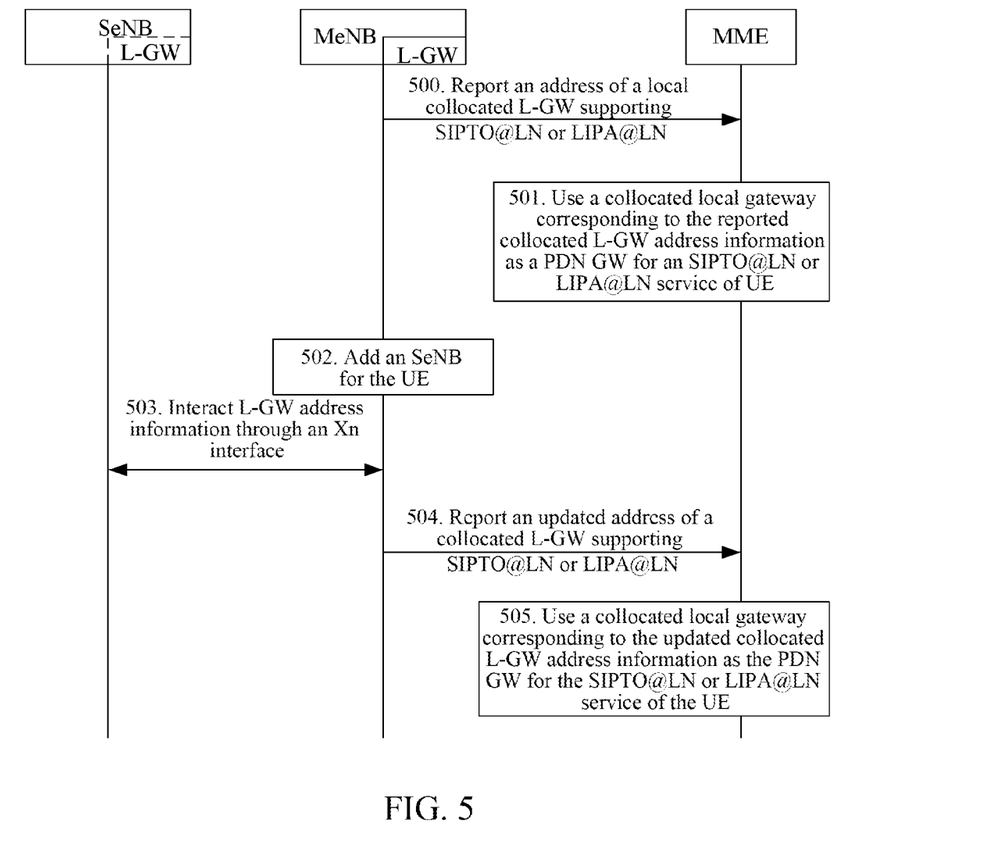
FIG. 5 is a flowchart of a method for implementing a local gateway service in a small base station system provided by embodiment 1 of the present document.

FIG. 5 is a flowchart of a method for implementing a local gateway service in a small base station system provided by embodiment 1 of the present document. As shown in FIG. 5, in embodiment 1, supposing that an MeNB supports a collocated service, the specific implementation comprises the following steps:

In step 500, when UE accesses to an MeNB, the MeNB reports collocated L-GW address information of the MeNB itself to an MME through an S1 interface message.

In this step, the S1 interface message can be a common S1 interface message and can also be a UE-special S1 interface message, herein the common S1 interface message can be one or more of an S1 establishment request message and a base station configuration update message; the UE-special S1 interface message can be one or more of an initial UE message and an uplink NAS transport message, and however, the UE-special S1 interface message is not limited to the listed S1 interface messages.

In step 501, the MME uses a collocated local gateway corresponding to the collocated L-GW address information reported by the MeNB as a PDN GW for an SIPTO@LN or LIPA@LN service of the UE.

In Steps 502-503, the MeNB determines to add an SeNB for the UE according to a measurement report reported by the UE, establish an Xn interface between the MeNB and the SeNB, and interact collocated local gateway address information through an Xn interface process.

In these steps, the Xn interface process can be an Xn interface establishment process, a base station configuration update process or an Xn interface message related to the UE.

After the MeNB interacts the collocated local gateway information of the SeNB through the Xn interface process, the MeNB can determine whether to add the SeNB to provide a dual-connection service for the UE according to a preset local policy of the MeNB. For example, if the SeNB does not support the collocated local gateway, the MeNB can add the SeNB as another base station for bearing user plane data issuance; and if the SeNB supports the collocated local gateway, the MeNB can select to use the collocated local gateway on the SeNB as the PDN GW for the SIPTO@LN or LIPA@LN service of the UE according to other information such as load information.

In step 504, the MeNB, reports an updated collocated local gateway address, e.g., a collocated gateway address of a selected SeNB, to the MME through an S1 interface message.

In this step, the S1 interface message can be a common S1 interface message and can also be a UE-special S1 interface message, herein the common S1 interface message can a base station configuration update message; the UE-special S1 interface message can be one or more of an initial UE message and an uplink NAS transport message, and however, the UE-special S1 interface message is not limited to the listed S1 interface messages.

In step 505, the MME performs local update according to the collocated L-GW address information reported by the MeNB, and uses the collocated local gateway corresponding to the current collocated L-GW address as the PDN GW for the SIPTO@LN or LIPA@LN service of the UE.

Figure 6:
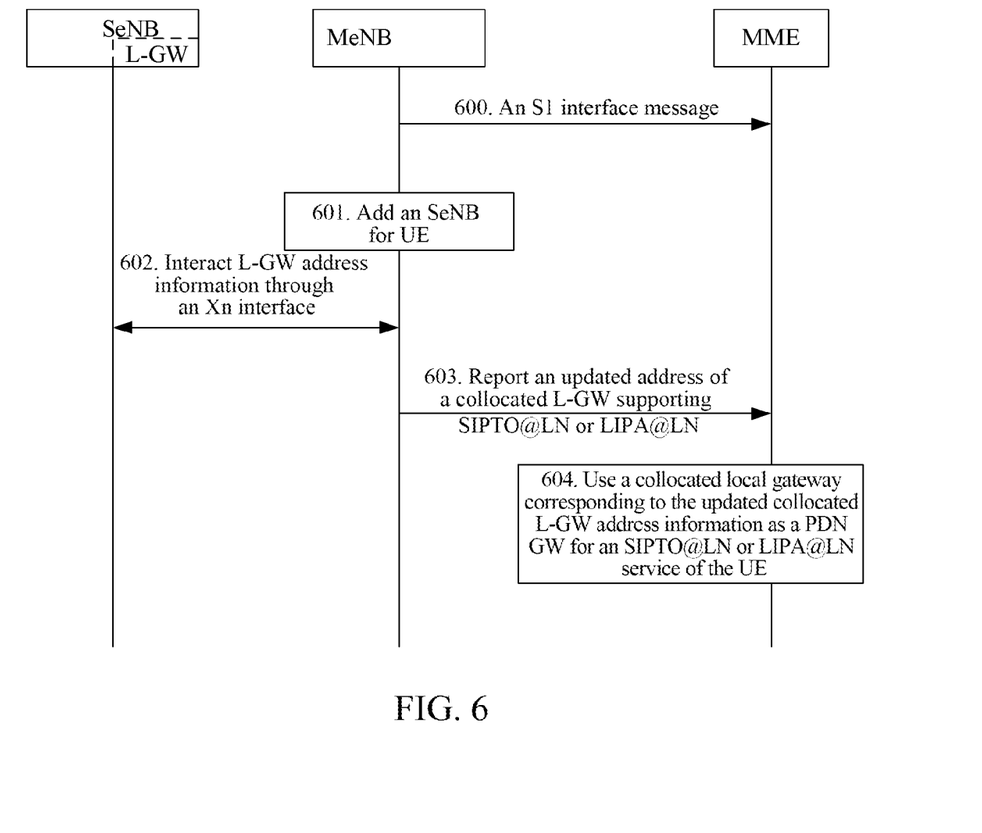
FIG. 6 is a flowchart of a method for implementing a local gateway service in a small base station system provided by embodiment 2 of the present document.

FIG. 6 is a flowchart of a method for implementing a local gateway service in a small base station system provided by embodiment 2 of the present document. As shown in FIG. 6, in embodiment 2, supposing that an MeNB does not support a collocated service, and the specific implementation comprises the following steps:

In step 600, when UE accesses to an MeNB, the MeNB transmits an S1 interface message to an MME, herein the S1 interface message does not carry collocated L-GW address information of an eNB.

In steps 601-602, the MeNB determines to add an SeNB for the UE according to a measurement report reported by the UE, establish an Xn interface between the MeNB and the SeNB, and interact collocated local gateway address information through an Xn interface process.

In these steps, the Xn interface process can be an Xn interface establishment process, a base station configuration update process or an Xn interface message related to the UE.

After the MeNB interacts the collocated local gateway information of the SeNB through the Xn interface process, the MeNB can determine whether to add the SeNB to provide a dual-connection service for the UE according to a preset local policy of the MeNB. For example, if the SeNB does not support the collocated local gateway, the MeNB can add the SeNB as another base station for bearing user plane data issuance; and if the SeNB supports the collocated local gateway, the MeNB can select to use the collocated local gateway on the SeNB as a PDN GW for an SIPTO@LN or LIPA@LN service of the UE according to other information such as load information.

In step 603, the MeNB reports an updated collocated local gateway address, e.g., a collocated gateway address of a selected SeNB to the MME through an S1 interface message.

In this step, the S1 interface message can be a common S1 interface message and can also be a UE-special S1 interface message, herein the common S1 interface message can a base station configuration update message; the UE-special S1 interface message can be one or more of an initial UE message and an uplink NAS transport message, and however, the UE-special S1 interface message is not limited to the listed S1 interface messages.

In step 604, the MME performs local update according to the collocated L-GW address information reported by the MeNB, and uses the collocated local gateway corresponding to the current collocated L-GW address as the PDN GW for the SIPTO@LN or LIPA@LN service of the UE.

The above-mentioned embodiments are just preferred embodiments of the present document and are not used for limiting the protection range of the present document. Any modifications, equivalent replacements, improvements and the like made within the spirit and the principle of the present document shall also be included in the protection range of the present document.

INDUSTRIAL APPLICABILITY

The technical solution provided by the present application comprises: a first connection device adds a second connection device for a terminal; collocated local gateway address information is interacted between the first connection device and the second connection device; and the first connection device reports determined collocated local gateway address information to a core network, and the core network uses the collocated local gateway address information to perform the local gateway service. Through the technical solution provided by the embodiment of the present document, the core network obtains the collocated local gateway address information, and the local gateway service is implemented aiming at a dual-connection service scenario.

What is claimed is:

1. A method for implementing a local gateway service, comprising:
   accessing, by a terminal, to a first connection device;
   adding, by the first connection device, a second connection device for the terminal to implement a dual-connection;
   interacting collocated local gateway address information between the first connection device and the second connection device;
   determining, by the first connection device, whether the second connection device carries the collocated local gateway address information;
   when determining, by the first connection device, the second connection device does not support the collocated local gateway by confirming the second connection device does not carry the collocated local gateway address information, the first connection device adds the second connection device as another base station for bearing user plane data issuance;
   when determining, by the first connection device, the second connection device does support the collocated local gateway by confirming the second connection device does carry the collocated local gateway address information, the first connection device can select whether to use the collocated local gateway on the second connection device as the PDN GW for the SIPTO@LN or LIPA@LN service of the UE according to other information; and
   reporting, by the first connection device, determined collocated local gateway address information to a core network, and using, by the core network, the collocated local gateway address information to perform the local gateway service, wherein the first connection device supports a collocated Local GateWay (L-GW);
   and when the terminal accesses to the first connection device, the method further comprises:
   reporting, by the first connection device, local collocated L-GW address information of the first connection device itself to the core network; and
   using, by the core network, a collocated local gateway corresponding to an obtained collocated L-GW address as a Packet Data Network GateWay (PDN GW) for a Selected IP Traffic Offload @ Local Network (SIPTO@LN) or Local IP Access @ Local Network (LIPA@LN) service of the terminal, wherein the first connection device is a master base station (MeNB) and the second connection device is a secondary base station (SeNB); and reporting, by the first connection device, local collocated L-GW address information of the first connection device itself to the core network comprises:

reporting, by the MeNB, the local collocated L-GW address information to a Mobility Management Entity (MME) in the core network through an initial UE S1 interface message;

wherein interacting collocated local gateway address information between the first connection device and the second connection device comprises:

establishing a connection interface between the first connection device and the second connection device; and interacting the collocated local gateway address information through the established connection interface;

wherein reporting, by the first connection device, determined collocated local gateway address information to the core network comprises:

reporting, by the MeNB, an updated collocated local gateway address of the SeNB to the MME in the core network through an uplink NAS transport S1 interface message according to a result of a preset local policy of the MeNB.

2. The method according to claim 1, wherein
the connection interface is an Xn or X2 interface; and
interacting the collocated local gateway address information through the established connection interface comprises: obtaining, by the MeNB, collocated local gateway information of the SeNB through a connection interface establishment process, a base station configuration update process or a connection interface message related to UE corresponding to the terminal, and determining whether to add the SeNB to provide a dual-connection service for the UE corresponding to the terminal according to the local policy.

3. The method according to claim 1, wherein using, by the core network, the collocated local gateway address information to perform the local gateway service comprises:
using, by the core network, the collocated local gateway corresponding to the updated collocated local gateway address as the PDN GW for an SIPTO@LN or LIPA@LN service of the UE corresponding to the terminal.

4. A system for implementing a local gateway service, comprising a first connection device, a second connection device, a core network device and a terminal, wherein,
the terminal is configured to access to the first connection device;
the first connection device is configured to: add the second connection device for the terminal to implement a dual-connection; interact collocated local gateway address information with the second connection device; determine whether the second connection device carries the collocated local gateway address information; when determining the second connection device does not support the collocated local gateway by confirming the second connection device does not carry the collocated local gateway address information, adding the second connection device as another base station for bearing user plane data issuance; when determining the second connection device does support the collocated local gateway by confirming the second connection device does carry the collocated local gateway address information, selecting whether to use the collocated local gateway on the second connection device as the PDN GW for the SIPTO@LN or LIPA@LN service of the UE according to other information; and report determined collocated local gateway address information to the core network device;

the second connection device is configured to interact the collocated local gateway address information with the first connection device; and the core network device is configured to receive collocated local gateway address information reported by the first connection device and use the collocated local gateway address information to perform the local gateway service, wherein the first connection device is further configured to support a collocated L-GW, and when the terminal accesses to the first connection device, report local collocated L-GW address information of the first connection device itself to the core network device; and the core network device is further configured to use a collocated local gateway corresponding to an obtained collocated L-GW address as a PDN GW for an SIPTO@LN or LIPA@LN service of the UE;

wherein the first connection device is a master base station (MeNB) and the second connection device is a secondary base station (SeNB); and reporting, by the first connection device, local collocated L-GW address information of the first connection device itself to the core network comprises:

reporting, by the MeNB, the local collocated L-GW address information to a Mobility Management Entity (MME) in the core network through an initial UE S1 interface message;

wherein interacting collocated local gateway address information with the second connection device comprises:

establishing a connection interface between the first connection device and the second connection device; and interacting the collocated local gateway address information through the established connection interface, wherein reporting, by the first connection device, determined collocated local gateway address information to the core network comprises:

reporting, by the MeNB, an updated collocated local gateway address to the MME in the core network through an uplink NAS transport S1 interface message according to a result of a preset local policy of the MeNB.

* * * * *